United States Patent [19]

Kanbe et al.

[11] 4,256,831
[45] Mar. 17, 1981

[54] LIGHT-SENSITIVE PHOTOGRAPHIC ELEMENT COMPRISING A MAGENTA IMAGE DYE-PROVIDING COMPOUND

[75] Inventors: Masaru Kanbe; Kazumasa Watanabe; Morito Uemura; Jiro Takahashi; Ryuichiro Kobayashi; Tatsuhiko Kobayashi, all of Hino, Japan

[73] Assignee: Konishiroku Photo Industry Co., Ltd., Tokyo, Japan

[21] Appl. No.: 68,508

[22] Filed: Aug. 22, 1979

[30] Foreign Application Priority Data

Aug. 31, 1978 [JP] Japan .................................. 53-106463

[51] Int. Cl.³ .................. G03C 1/10; G03C 1/40; G03C 5/54
[52] U.S. Cl. .................................. 430/562; 430/223; 430/242
[58] Field of Search ............... 430/222, 223, 225, 226, 430/242, 562

[56] References Cited

U.S. PATENT DOCUMENTS 3,954,476  5/1976  Krutak et al. .......................... 430/223

Primary Examiner—Richard L. Schilling
Attorney, Agent, or Firm—Frishauf, Holtz, Goodman & Woodward

[57] ABSTRACT

A light-sensitive photographic element comprising a support and at least one light-sensitive silver halide emulsion layer coated thereon having associated therewith a magenta image dye-providing compound which releases a magenta dye or a precursor thereof corresponding to the imagewise exposure of said emulsion layer, said magenta dye-providing compound being a compound represented by formula [I]:

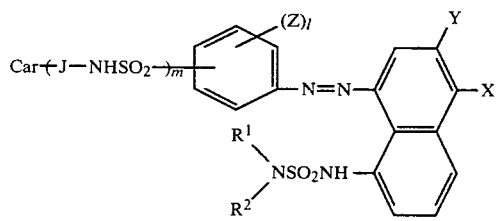

wherein
Car represents a carrier moiety which can be oxidized under alkaline conditions to release a diffusible dye or a precursor thereof from said compound;
$R^1$ and $R^2$, which may be the same or different, independently represent a hydrogen atom or an alkyl group having 1 to 3 carbon atoms (provided that the total sum of carbon atoms in $R^1$ and $R^2$ does not exceed 5), or $R^1$ and $R^2$ may form, together with the nitrogen atom,

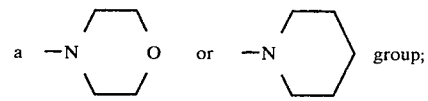

X represents a hydroxyl group, a salt thereof or a group, which can be converted into a hydroxyl group by hydrolysis, having the following formula:

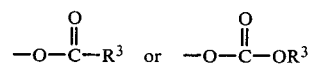

in which $R^3$ represents an alkyl or haloalkyl group having 1 to 18 carbon atoms or a phenyl group which may be substituted;
Y represents a

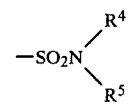

group in which $R^4$ and $R^5$,
which may be the same or different, independently represent a hydrogen atom, an alkyl group having 1 to 6 carbon atoms or a cycloalkyl group (provided that the total sum of carbon atoms in $R^4$ and $R^5$ does not exceed 6);
Z represents a hydrogen atom, a chlorine atom, a methyl group or a methoxy group;
l is 1 or 2 provided that when l is 2 each Z may be the same or different;
m is 0 or 1;
and
J represents a bivalent linking group having the formula $-R^6-(O)_n-R_p^7-$ in which $R^6$ and $R^7$, which may be the same or different, independently represent an alkylene group having 1 to 8 carbon atoms, a phenylene group which may be substituted; n represents 0 or 1; p represents 0 or 1 provided that p is 1 when n is 1 and 1 or 0 when n is 0 (provided that, when p is 1, the total sum of carbon atoms in $R^6$ and $R^7$ does not exceed 13).

9 Claims, No Drawings

LIGHT-SENSITIVE PHOTOGRAPHIC ELEMENT COMPRISING A MAGENTA IMAGE DYE-PROVIDING COMPOUND

This invention relates to a light-sensitive photographic element preferably for the use of color diffusion transfer process, which comprises a magenta image dye-providing compound. More particularly, this invention relates to a light-sensitive photographic element for the use of color diffusion transfer process, which comprises a non-diffusible magenta image dye-providing compound which can be oxidized by an oxidation product of a silver halide developing agent and thereby can release a diffusible magenta dye or a precursor thereof under alkaline conditions (Dye Releasing Redox Compound, hereinafter referred to as "DRR compound").

In a color diffusion transfer process using a DRR compound (hereinafter referred to as "DRR process"), a light-sensitive layer comprising a light-sensitive silver halide emulsion layer, which is associated with said emulsion layer and contains a non-diffusible dye image-providing substance, i.e., DRR compound is subjected to imagewise exposure to form a latent image in said emulsion layer and then the light-sensitive layer thus exposed is processed with an alkaline processing composition in the presence of a silver halide developing agent. When processed with the alkaline processing composition, said light-sensitive layer and an image receiving layer are in a superposed state. Where an oxidation product of the silver halide developing agent is formed as a result of the processing by said alkaline processing composition, said DRR compound is oxidized with said oxidation product to release a diffusible dye or a precursor thereof. The diffusible dye or dye precursor thus released from the DRR compound is transferred by diffusion to said image receiving layer, thereby forming dye-image.

Since in the DRR process, substance which is to be transferred to an image receiving layer is composed of only a diffusible dye portion or precursor portion of a DRR compound and does not include a silver halide developing agent portion, a p-phenylenediamine group compound is not necessarily used as a silver halide developing agent, and, according to one of preferred embodiments, a silver halide developing agent which is used for black-and-white photography can also be used. Accordingly, a dye image having less color stain can be obtained in this process. In this respect, the DRR process is more advantageous as compared with a process in which a dye developer is used as described in British Pat. No. 804,971 and a process in which nondiffusible image dye providing compound which is capable of releasing a diffusible dye or a precursor thereof on coupling reaction with a silver halide color developing agent oxidized by silver halide is used as described in U.S. Pat. Nos. 3,227,550, 3,443,940 and 3,227,551, and British Patent No. 904,365. Certain classes of DRR compounds and color diffusion transfer processes (DRR process) using those DRR compounds are described, for example, in U.S. Pat. Nos. 3,245,789, 3,443,939, 3,443,940, 3,443,943, 3,698,897, 3,725,962, 3,728,113, 3,751,406, 3,844,785, 3,928,312, 3,929,760, 3,931,144, 3,932,380, 3,932,381, 3,942,987, 3,993,638, 3,954,476, 4,001,204 and 4,013,635; Research Disclosures 13024(1975), 15157(1976), 16625(1978) and 16629(1978); Japanese Pat. Publication Laid Open to Public Inspection (hereinafter referred as LOP) Nos. 50-118723/1975, 51-104343/1976, 51-113624/1976, 51-114930/1976, 52-7727/1977, 52-8827/1977, 52-106727/1977, 53-3819/1978, 53-3820/1978, 53-4544/1978, 53-23628/1978, 53-35533/1978, 53-46730/1978, 53-47823/1978, 53-50734/1978 and 53-66227/1978.

Although all of these conventional DRR compounds are valuable, a novel image dye-providing compound having more improved properties, e.g., improved color, diffusibility, mordantability, light-stability has been sought in the art.

The present inventors have studied and developed a series of new magenta DRR compound which can most appropriately be used for a light-sensitive photographic element for color diffusion transfer process. The magenta DRR compound of the invention releases a diffusible dye or a precursor thereof as a result of oxidation under alkaline conditions. The compound of the present invention is characterized, and is distinct from those compounds disclosed in U.S. Pat. Nos. 3,932,381, 3,932,380, 4,001,204 and 3,954,476, in that it comprises an aminosulfonylamino group at the 5-position in relation to a substituent X in the naphthalene ring of the azo dye portion.

According to the present invention it is possible to prevent an undesirable additional diffusion, which often occurs to known compounds over a long period of timer after image-forming process, while maintaining excellent color stability over a wide range of pH and light stability.

Generally, a DRR compound should have the following properties.
(1) It should be soluble in a water-immiscible solvent and should easily be dispersed in gelatin.
(2) It should be immobile before processing or before releasing of a dye.
(3) It should be stable under storage for a long period of time and under processing conditions at high pH.
(4) It should be oxidized rapidly in the presence of an oxidation product of a developing agent.
(5) Oxidized DRR compound should be cleaved rapidly under alkaline conditions.

Further, the dye which is released from such DRR compound should have additional important properties as mentioned below.
(1) Diffusibility: through gelatin and other binder components between DRR compound containing layer and an image receiving layer.
(2) Necessary color: suitable λ max, half-value width (width of a spectrum at ½λ max) and inexistence of undesirable absorption.
(3) Chemical stability: stability at higher pH, and stability under reductive conditions during processing and under an oxidative atmosphere over a long period of time after processing.
(4) Solubility at high pH.
(5) To be dyed to mordant at high pH.
(6) Low solubility at low pH.
(7) Stability in color over a wide range of pH in the system.
(8) Not to be desorbed after mordanted.
(9) It should provide a stable color against the change of the surrounding environment for a long period of time, e.g., the gradual change from wet state to dry state of the image-receiving part after processing.

(10) Light stability.

(11) High extinction coefficient: to afford higher image density by using less amount of DRR compound.

In order to satisfy these requirements, the DRR compound should be selected strictly and specially with respect to the whole and partial molecular structure of the molecule. A DRR compound generally consists, in a functional sense, of a dye portion, a carrier portion which releases a dye by oxidation and hydrolysis, and a linkage portion connecting them. Each portion should not inhibit the functions of other portions and the properties provided by the molecular structure as a whole should be preferable.

An object of this invention is to provide a novel magenta DRR compound which possesses improved properties as compared with known DRR compounds. Another object of this invention is to provide light-sensitive photographic element which comprises a novel magenta DRR compound associated with at least one light-sensitive silver halide emulsion layer coated on a support.

The DRR compounds according to this invention can be represented by following formula [I]:

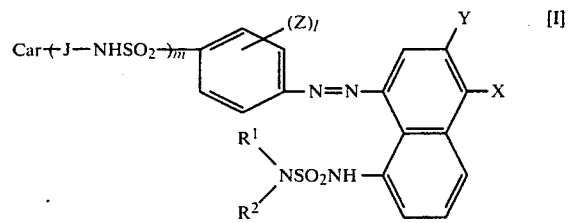

wherein
Car represents a carrier moiety which can be oxidized, preferably by an oxidation product of a silver halide developing agent, under alkaline conditions to release a diffusible dye or a precursor thereof from said compound;

$R^1$ and $R^2$, which may be the same or different, independently represent a hydrogen atom or an alkyl group, which may be of straight chain or branched, having 1 to 3 carbon atoms (provided that the total sum of carbon atoms in $R^1$ and $R^2$ does not exceed 5), or $R^1$ and $R^2$ may form, together with the nitrogen atom,

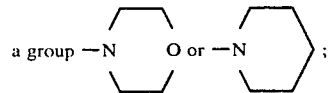

X represents an auxochrome group of the dye portion, i.e., a hydroxyl group, a salt thereof or a group which can be converted into a hydroxyl group by hydrolysis having the following formula:

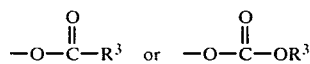

in which $R^3$ represents an alkyl or haloalkyl group, which may be of straight chain or branched, preferably having 1 to 18 carbon atoms, a phenyl group which may (having at least one, preferably 1 to 3 halogen atoms such as chlorine, fluorine or bromine in the α-position) be substituted by at least one, preferably 1 to 3 substituents, such as, a chlorine atom or a nitro group;

Y represents a

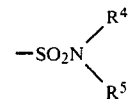

group in which $R^4$ and $R^5$, which may be the same or different, independently represent a hydrogen atom an alkyl group, which may be of straight chain or branched, having 1 to 6 carbon atoms or a cycloalkyl group having, preferably, 5 to 6 carbon atoms (provided that the total sum of carbon atoms in $R^4$ and $R^5$ does not exceed 6);

Z represents a hydrogen atom, a chlorine atom, a methyl group or a methoxy group;

l is 1 or 2 provided that when l is 2 each Z may be the same or different;

m is 0 or 1;

and

J represents a bivalent linking group having the formula —$R^6$—(O)$_n$—$R_p^7$— in which $R^6$ and $R^7$, which may be the same or different, independently represent an alkylene group, which may be of straight chain or branched, having 1 to 8 carbon atoms, a phenylene group which may be substituted by at least one, preferably 1 to 2 substituents such as a chlorine atom, a methyl group or a methoxy group provided that when substituted by 2 substituents, they may be the same or different;

n represents 0 or 1; p represents 0 or 1 provided that p is 1 when n is 0 (provided that, when p is 1, the total sum of carbon atoms in $R^6$ and $R^7$ does not exceed 13).

In this invention, as a carrier moiety (Car) anyone of those heretofore known in the art can be used; preferred DRR compounds according to this invention have as Car a group represented by following general formulae [II], [III] or [IV].

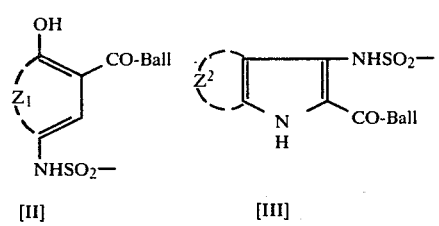

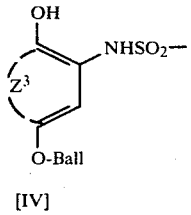

wherein Ball represents an organic ballast group having such number of carbon atoms as to render the DRR compound involved nondiffusibility during processing in an alkaline processing composition; $Z^1$ represents a group of carbon atoms required to complete the benzene, 5,6,7,8-tetrahydronaphthalene or naphthalene ring; $Z^2$ and $Z^3$ independently represent a group of carbon atoms necessary to complete a benzene ring. The benzene, 5,6,7,8-tetrahydronaphthalene or naphthalene ring may be substituted with one or more, preferably 1 to 2, groups. As the substituents may be mentioned, for example, an alkyl group, an alkoxy group, a chlorine atom, a carbamoyl group, etc. Particularly useful substituent for $Z^3$ is an electron donating group such as an alkyl, alkoxy, alkylthio or arylthio group. Among DRR compounds according to this invention, preferable compounds represented by formula [I] have, in the dye moiety, an aminosulfonylamino group represented by

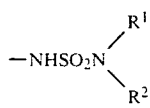

at the 5-position in relation to X in the naphthalene ring to which an azo group (—N═N—) is attached.

Preferably $R^1$ or $R^2$ is selected from a group consisting of a hydrogen atom, a methyl or ethyl group, or

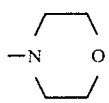

wherein $R^1$ and $R^2$ is combined each other to form a ring. More preferably $R^1$ or $R^2$ is selected from a methyl or ethyl and most preferably $R^1$ and $R^2$ are both methyl groups. Further, it is preferred that $R^1$ and $R^2$ are same atoms or groups.

Also $R^4$ or $R^5$ is preferably selected from a group consisting of a hydrogen atom and an alkyl group, which may be of straight chain or branched, having 1 to 6 carbon atoms, more preferably from a straight chain or branched alkyl having 1 to 4 carbon atoms and most preferably $R^4$ is a hydrogen atom and $R^5$ is a tert-butyl group.

Z is preferably a hydrogen atom attached to the 2-position of benzene ring with respect to the azo group.

J is preferably

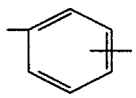

and more preferably,

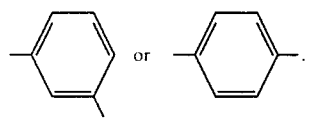

As the Car moiety according to this invention, one represented by formulae [II] or [III] mentioned above are more preferable, and as the organic ballast group (Ball) may preferably be selected from a group represented by a general formula

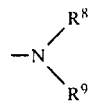

in which $R^8$ and $R^9$ independently represent a hydrogen atom, an alkyl, cycloalkyl or aryl group, a combination thereof directly connected with each other or through a bivalent organic group such as an ether group, ester group or a carbamoyl group provided that said alkyl group may be of straight chain or branched. Preferably the total sum of carbon atoms in $R^8$ or $R^9$ does not exceed 34 and the total sum of carbon atoms in $R^8$ and $R^9$ is from 12 to 36. Preferably $R^8$ is selected from a group consisting of a hydrogen atom and an alkyl group, preferably of straight chain, having 1 to 22 carbon atoms and more preferably $R^8$ is a hydrogen atom, methyl group or ethyl group. $R^9$ preferably has 12 to 34 carbon atoms and is selected an alkyl group (preferably of straight chain) and an alkylsubstituted phenoxyalkyl group, e.g. 2,4-tert-amylphenoxy butyl group, etc.

The Ball group suitable for the Car moiety in the formula [IV] is an alkyl group which may be of straight chain or branched, or an aromatic hydrocarbon group and either group preferably has 12 to 36 carbon atoms and may be substituted by at least one substituent.

Representative examples for Ball are shown below.

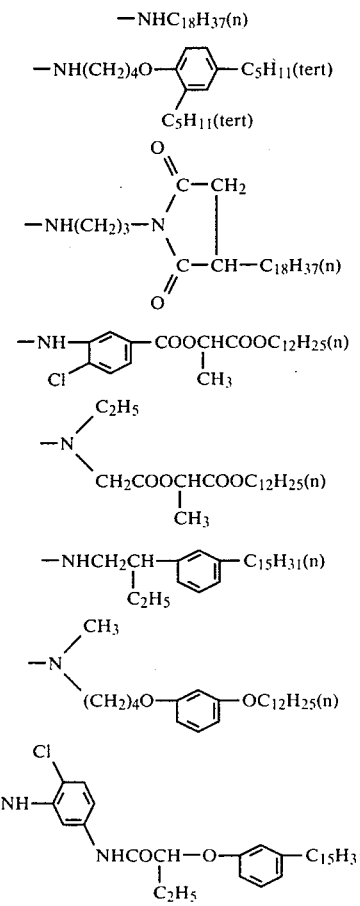

Some preferred examples for Car- are illustrated below.

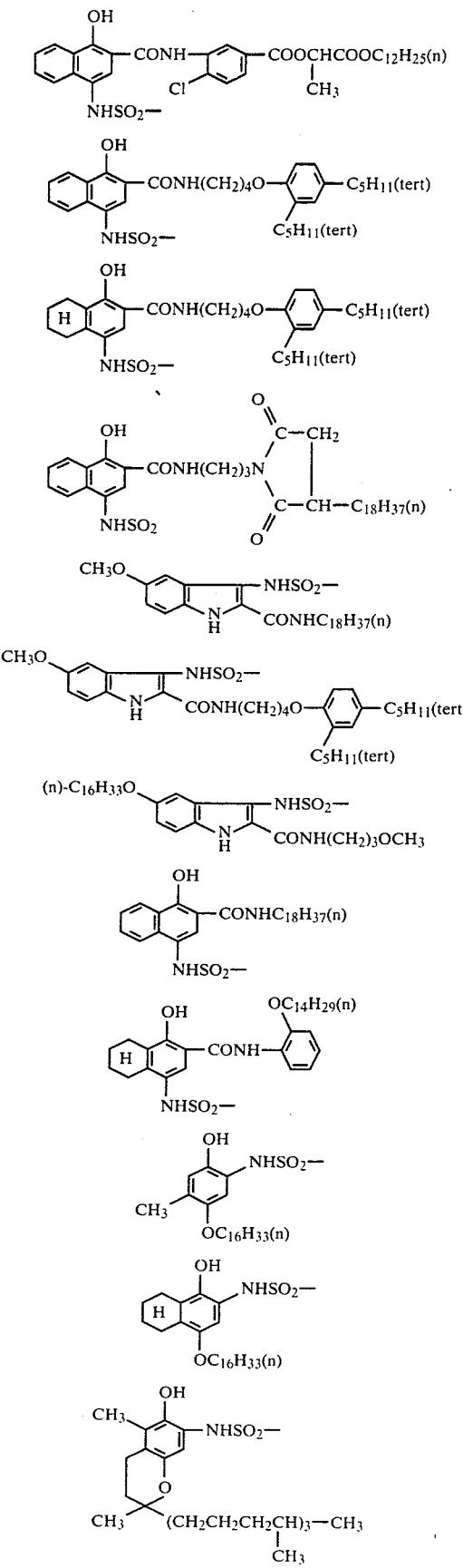

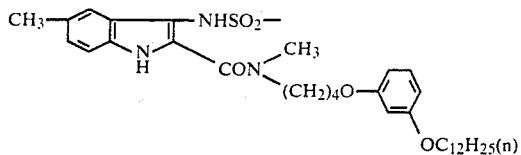

As the method for dispersing the magenta DRR compound according to this invention in a light-sensitive photographic element, there may be employed various methods which are heretofore known, examples of which methods are mentioned below.

(1) A method in which the magenta DRR compound according to this invention is dissolved in a substantially waterinsoluble solvent having high boiling point and thereafter disperse it finely in a hydrophilic colloid.

In this method as the particularly useful high boiling solvent, there may be mentioned N-n-butylacetanilide, N,N-diethyllaurylamide, N,N-dibutyllaurylamide, dibutyl phthalate, tricresyl phosphate, N-dodecylpyrrolidone, etc.

In order to facilitate the dissolution, a low boiling point solvent or an water-miscible organic solvent may be used.

As the low boiling point solvent may be mentioned, for example, ethyl acetate, methyl acetate, cyclohexanone, acetone, methanol, ethanol and tetrahydrofuran, and as the water-miscible organic solvent, for example, 2-methoxyethanol, dimethylformamide may be used. These low boiling solvent and water-miscible organic solvent can be removed by using water or during drying process after coating.

(2) A method in which the magenta DRR compound according to this invention is incorporated into or onto loadable polymer latex particles by adding said polymer latex and water in such an amount as to sufficiently insolubilize the dissolved magenta DRR compound to a solution of the magenta DRR compound dissolved in a water-miscible organic solvent.

Useful water-miscible organic solvents and said polymer latices which can advantageously be employed in this invention are described in hereinbefore mentioned LOP Nos. 51-59942/1976 and 51-59943/1976.

(3) A method in which the magenta DRR compound according to this invention is finely pulverlized mechanically by using a sand grinder, a colloid mill or the like and thereafter dispersed in a hydrophilic colloid.

(4) A method described in, for example, LOP No. 53-139532/1978 in which the magenta DRR compound according to this invention, after being dissolved in a water-miscible organic solvent, is precipitated in said solvent, preferably in the presence of a surfactant and thereafter the thus formed precipitate is dispersed in a hydrophilic colloid.

(5) A method in which the DRR compound according to this invention, after being dissolved in an alkaline aqueous solution together with a polymer, is precipitated, by adjusting the pH value of said solution with an acid and thereafter thus formed precipitate is dispersed in a hydrophilic colloid.

Other various methods may also be applied to obtain a dispersion used in this invention.

As the hydrophilic protective colloid may be used ones similar to those for a silver halide emulsion as mentioned hereinbelow.

The cyan DRR compound used in this invention, which is to be associated with the silver halide emulsion, may be incorporated in the silver halide emulsion layer and/or at least one layer other than the silver halide emulsion layer, preferably in a layer which is located adjacent to said emulsion layer and on the opposite side of said emulsion layer with respect to the direction from which exposure is performed.

As mentioned above, a diffusible dye or dye precursor can be released imagewise as a function of an oxidation product of a silver halide developing agent under alkaline conditions, by associating the cyan DRR compound according to this invention with a silver halide emulsion layer.

The light-sensitive photographic element according to this invention comprises a support and at least one light-sensitive silver halide emulsion layer coated thereon and having associated therewith the magneta DRR compound according to this invention.

The light-sensitive silver halide emulsion used in this invention is composed of a colloidal dispersion containing, e.g., silver chloride, silver bromide, silver chlorobromide, silver iodobromide, silver chloroiodobromide or a mixture thereof. For the silver halide grains used for the silver halide emulsion, either fine or coarse grains can be used, but ones having an average grain size of around $0.1\mu$ to around $2\mu$ are preferable.

Further, the silver halide emulsion used this invention can be prepared according to any conventional method, and such well known emulsions as a single jet emulsion, a Lippmann emulsion or an emulsion ripened with thiocyanate or thioether may be employed.

Also either an emulsion comprising silver halide grains having substantial light-sensitivity on the surface of said grains or an emulsion comprising silver halide grains having substantially internal light-sensitivity may be used.

Further, in the present invention, both negative type emulsions and direct positive type emulsions may be used.

As the hydrophilic colloid used for the silver halide emulsion, gelatin may be preferably used, however, other hydrophilic colloids may also be used. These hydrophilic colloids may be used singly or in combination. Further, latex-like polymer dispersion of a hydrophobic monomer such as an alkyl acrylate may be incorporated in the hydrophilic colloidal layer.

These hydrophilic colloids may be insolubilized with various hardeners without deteriorating the permeability of the processing agent and these hydrophilic colloidal layers may comprise, besides the hardner, a hardening accelerator such as carbonate.

The silver halide emulsion used in this invention may contain conventional chemical sensitizers, a speed increasing compounds such as polyalkylene glycol, cationic surfactant, or thioether, or a combination thereof, antifoggants or stabilizers such as an optically sensitizers such as cyanine, merocyanine, styryl, hemicyanine (e.g., enamine hemicyanine), oxonol or hemioxonol dyes.

According to this invention when the magenta DRR compound is used in combination with a negative type silver halide emulsion, the dye image obtained in the image receiving layer is a negative image. Therefore, in order to obtain a positive dye image in the image receiving layer various reversal processes are employed.

For example, a method in which a direct positive type silver halide emulsion is used, as described in U.S. Pat. Nos. 3,227,552, 2,592,250, 2,005,837, 3,367,778, 3,761,276, British Pat. No. 1,011,062, Japanese Patent Publication No. 41-17,184/1966 and LOP No. 50-8,524/1975; a method in which a physical development is utilized, as described in British Pat. No. 904,364, LOP No. 47-325/1972 and a method in which a dye image-providing substance is added in a fogged emulsion and a negative type silver halide emulsion layer comprising a compound which releases a development-inhibiting agent upon reaction with the oxidized developing solution is used as an adjacent layer, as described in U.S. Pat. Nos. 3,227,654 and 3,632,345 can be mentioned.

Among various methods used for obtaining a positive dye image a method in which a direct positive type silver halide emulsion is used is preferred. As the direct positive type silver halide emulsion may be mentioned, for example, a silver halide emulsion, the whole surface of which is made to be developable by preliminary exposure or by chemical treatment and which becomes undevelopable imagewise after imagewise exposure thereof to light.

As the other direct positive type silver halide emulsion may be mentioned a direct positive type silver halide emulsion which has mainly internal light-sensitivity. According to a preferred embodiment of this invention a direct positive silver halide emulsion of the latter type which is described, for instance, in U.S. Pat. No. 2,761,276, may be used. The direct positive silver halide emulsion of this type forms a latent image mainly inside the silver halide grains upon imagewise exposure, and produces a positive silver image upon surface development under fogged conditions.

There are various methods for developing the silver halide emulsion under such fogged conditions. For example, the so-called developer capable of producing aerial fog described in German Pat. No. 850,383 and U.S. Pat. No. 2,497,875 may be used or the whole surface may be subjected to exposure to flash-light upon development. This latter method is described in German Pat. No. 854,888, U.S. Pat. No. 2,592,298, British Pat. Nos. 1,150,553, 1,195,838 and 1,187,029. Further the development may be conducted in the presence of a fogging agent. As the fogging agent used for this purpose, hydrazine type compounds, N-substituted quarternary ammonium salts and the like may be used either singly or in combination. Among these fogging agents, 1-[4-(2-formylhydrazino)phenyl]-3-phenylthiourea and a combination of $\beta$-acetylphenylhydrazine and t-butylaminoborane may preferably be employed. The amount of the fogging agent thus employed may be varied widely depending upon the purpose, however, in general the use of the agent ranging from 0.1 to 2.0 g per liter of a processing solution and from 0.001 to 0.2 g per square meter of a coated emulsion when added to the light-sensitive element.

In this invention, the above-mentioned negative silver halide emulsion or various reversal method may be used to obtain optionally a negative or positive dye image on the image receiving layer depending upon the combination with the magenta DRR compound. In order to avoid the decrease of the sensitivity of a light-sensitive silver halide emulsion, it is generally preferable that the cyan DRR compound is incorporated in a layer located on the opposite side of the silver halide emulsion layer with respect to the direction from which exposure is performed. However, when a Leuco type image dye-providing substance, a blue-shift type image dye forming substance or other image dye forming substance which does not possess any dye structure at the time of exposure is used, they may be incorporated in the silver halide emulsion layer since they do not decrease the sensitivity of the emulsion. Further, they may also be incorporated in a layer located in front of the silver emulsion layer with respect to the exposure direction.

In this invention, multi-colored dye image may be obtained by using one or two combinations of other DRR compounds and silver halide emulsions in addition to the combination of the magenta DRR compound according to this invention and a light-sensitive silver halide emulsion layer. In this case, the range of the wave length over which the silver halide emulsion layer is sensitive and that of absorption by the dye-image, which a diffusible dye or precursor thereof released from the DRR compound associated with the emulsion layer forms on the image receiving layer, may be the same or different. When used for ordinary natural color photography, yellow DRR compound is combined with the blue sensitive emulsion layer, magenta DRR compound with the green sensitive emulsion layer and cyan DRR compound with the red sensitive emulsion layer, although they are employed in different for combination for the purpose of producing the so-called false color image.

In cases where this invention is applied to multi-color photography, an intermediate layer may advantageously be employed in the light-sensitive element. The intermediate layer is able to prevent undesirable interaction between emulsion layer units having different color-sensitivities as well as it controls the diffusibility of an alkaline processing composition. As materials used for the intermediate layer, gelatine, calcium arginate, a copolymer of vinyl acetate and crotonic acid, isopropylcellulose, hydroxypropylmethylcellulose, polyvinylamides, polyvinylamide graft copolymer, or a combination of a latex and a penetrant is advantageously employed.

The intermediate layer may comprise an agent which is capable of inhibiting interations between emulsion layer units selected depending upon the type of the DRR compounds and the alkaline processing composition to be used. For instance, a reducing agent such as nondiffusible hydroquinone derivatives, e.g., di-t-octylhydroquinone, potassium 2-octadecyl hydroquinone-2-sulfonate; a nondiffusible coupler which can react with the oxidation product of a developing agent to fix the same; an amidrazone compound; a hydrazone compound may be used to prevent the undesirable interaction between emulsion layers caused by the oxidation product of the developing agents.

Upon coating these above-mentioned layers, it is often advantageous to incorporate a coating aid in the coating composition so that the coating may be effected easily. It is also effective to add a thickner thereto.

As useful coating acids, there may be mentioned, for example, saponin, alkyl ether of sugar, monoalkyl ether of glycerol, ethoxyethylene addition compound of p-nonylphenol, sodium dodecylsulfate, sodium salt of dioctylsulfossuccinate, sodium p-dodecylbenzenesulfonate, betaine group compound described in British Pat. No. 1,159,825 and U.S. Pat. No. 3,441,413 and fluorinated compounds described in Japanese Patent Publication Nos. 49-46,733/1974 and 51-32,322/1976.

As the thickner there may be mentioned, for example, potassium salt of poly-p-sulfostyrene, cellulose sulfate, polyacrylamide, acrylic acid polymer described in U.S. Pat. No. 3,655,407.

For coating the coating composition mentioned above, various methods may be used, for example, slide hopper method and the curtain flow method, dipping method, roller methods and air-knife method. Among these methods, slide hopper coating which enables multiple coating compositions to be coated simultaneously to form so many layers at a time.

The support for the light-sensitive photographic element of the invention may desirably be a plain and even material which does not cause any dimensional remarkable changes during the treatment with a processing composition. In general a flexible support is advantageously employed, and depending upon the purpose, a hard support such as a glass plate may also be used. As the flexible support anyone which is used for conventional light-sensitive materials e.g., a cellulose nitrate film, a cellulose acetate film, a polyvinyl acetal film, a polystyrene film, a polyethylene terephthalate film, a polycarbonate film or a baryta paper may advantageously be employed. In this invention, it is advantageous to use a support having vapor permeability in order that the exhalation of the water in the alkaline processing composition through the support is accelerated.

Either transparent or opaque support may be used in this invention depending upon various conditions, such as a manner of constitution of the light-sensitive layer which comprises a light-sensitive silver halide emulsion layer and a DRR compound associated therewith and image receiving layer, direction from which the element is exposed, manners and places where the processing is conducted (e.g. whether the processing is carried out in a light or a dark place etc.).

When a light-sensitive element using a transparent support is processed in the light place, in order to prevent the leakage of light, which is so-called a light piping effect, from a direction parallel to the thickness a transparent support into the silver halide emulsion layer the transparent support is desirably colored to such an extent as to enable prevention of the permeation of light in the surface direction but not to prevent the exposure and observation.

In cases where an opaque support is used for the purpose of screening light, a pigment such as carbon black, titanium oxide, etc., may be incorporated in the support, or, if necessary, such pigment may be coated on the support with a suitable binder.

The support according to this invention may optionally contain various photographic additives; e.g., a plasticizer such as an ester of phosphoric acid or an ester of phthalic acid, a ultraviolet ray absorber such as 2-(2'-hydroxy-4-t-butylphenyl)benztriazole and an antioxidant such as a hindered phenol. In order to enhance the adhesion between the support and a layer coated thereon, it may be advantageous to have a subbing layer on the support or to apply a suitable surface treatment such as colona discharge treatment, ultraviolet ray irradiation treatment or flame treatment, to the support. The thickness of the support is not critical in this invention but a support having a thickness of 20 to 300μ may preferably be used.

Upon processing the above-mentioned light-sensitive layer with an alkaline processing composition after imagewise exposure, a diffusible dye or a precursor thereof produced corresponding to the imagewise exposure is diffusion-transferred to an image-receiving layer which is superimposed on the said light-sensitive layer, and then the dye is usually mordanted in said image receiving layer to form a dye-image. The image receiving layer may desirably contain a mordant.

As the mordant suitable for the image-receiving layer, any mordant may be used as long as it shows preferable mordanting effect upon the diffusible dye or dye precursor thus transferred. As the useful mordants there can be mentioned, for example, poly(styrene-co-N-vinylbenzyl-N,N,N-trihexylammonium chloride) as described in LOP No. 50-61228/1975, poly(styrene-co-vinylbenzylchloride-co-N-benzyl-N,N-dimethyl-N-vinylbenzylammonium chloride-co-divinylbenzene), poly-4-vinylpyridine, poly-4-vinyl-N-benzylpyridinium-paratoluenesulfonate, cetyltrimethylammonium bromide as described in LOP No. 51-73,440/1976 and a compound as described in LOP No. 54-1398/1979.

While the above-mentioned mordant is used in various dispersants such as an ordinary gelatin, polyvinyl alcohol, polyvinyl pyrrolidone, completely or partially hydrolyzed cellulose ester and the like, it is also possible for an image receiving layer to be consisted substantially of a dispersant having a mordanting effect, such as, poly-N-methyl-2-vinylpyridine, N-methoxy-methyl-poly-hexylmethyleneadipamide, a copolymer of vinyl alcohol and N-vinyl pyrrolidone or a polymer mixture thereof, or a partially hydrolyzed polyvinyl acetate, acetylcellulose, gelatin or polyvinyl alcohol. The content of the mordant in the image-receiving layer may preferably range from 10 to 100% by weight.

In a special embodiment, the mordant may be incorporated in the alkaline processing composition.

The image-receiving layer may further be incorporated with various photographic additives which are used in conventional photographic materials, such as a ultraviolet ray absorber, a fluorescent brightening agent, etc.

The above-mentioned image receiving layer is necessarily in a superimposed position on the light-sensitive layer at the time of processing with an alkaline processing composition, however, before they may be situated either separately or in combination. After the light-sensitive layer may remain combined with the image-receiving layer or the former may be peeled apart from the latter.

The image receiving layer may be coated, as constituting layer of the light-sensitive photographic element, on the same support upon which the light-sensitive layer is coated, on the same side of said light-sensitive layer or may be coated on a separate support from that for the light-sensitive layer. However, in cases where the light-sensitive layer and the image receiving layer exist separately before processing or when the light-sensitive layer is peeled off from the image-receiving layer after processing, the image receiving layer ordinarily is located on a separate support from that for the light-sensitive layer.

As a material for the support for the image receiving layer similar ones for the light-sensitive photographic element mentioned above can be used.

After the formation of dye image on an image-receiving layer is substantially completed by the application of an alkaline processing composition, it is preferable to lower the pH value within both the light-sensitive layer and image receiving layers to around 7 in order to increase the stability of the dye image as well as to prevent the discoloration or stain of the image caused at higher pH value by stopping substantially further diffusion of the dye or the precursor thereof. Therefore, it is preferable to locate a neutralizing layer containing a neutralizing agent which lowers the pH value within the system.

As the material to be used for the neutralizing agent may be preferred a film-forming polymer acid having at least one carboxyl group, sulfone group or group which forms a carboxyl group by hydrolysis.

As the polymer acid which may be used in this invention, there may preferably be mentioned one having a molecular weight of around 10,000 to around 100,000, e.g., monobutyl ester of a copolymer of maleic anhydride and ethylene (1:1); monobutyl ester of a copolymer of maleic anhydride and methyl viny ether (1:1); monoethyl ester, monopropyl ester, monopentyl ester or monohexyl ester of maleic anhydride and ethylene (1:1); monoethyl ester, monopropyl ester, monopentyl ester or monohexyl ester of maleic anhydride and methyl vinyl ether (1:1); polyacrylic acid, polymethacrylic acid and a copolymer of acrylic acid and methacrylic acid in various ratios; a copolymer of acrylic acid or methacrylic acid with other vinyl monomer i various ratios, i.e., a copolymer with, e.g., acrylic esters, methacrylic esters or vinyl ethers, which contain at least 30 mole %, preferably 50 to 90 mole % of acrylic or methacrylic acid; and so on. Further, metal salts described in Research Disclosure No. 12331, monomer acid, ballasted organic acid, alkyl phosphate, polyacrylphosphate, poly(1-acryloyl-2,2,2-trimethylhydrazinium) p-toluenesulfonate, etc. may also be employed singly or, if necessary, in combination with a binder polymer. Moreover, a combination of a polymer acid and a monomer acid or a polymer acid and an organic amine may also optionally be used. These polymer acids, monomer acids, organic amines and binder polymers may be coated after dissolved in an alcohol such as methanol, ethanol, propanol or butanol; a ketone such as acetone, methylethyl ketone, diethyl ketone, or cyclohexanone; an ester such as methyl acetate, ethyl acetate, isopropyl acetate or butyl acetate; or a mixture thereof. Further, these compounds may also be contained in microcapsules.

The thickness of the neutralizing layer may be varied depending upon the composition of an alkaline processing composition and materials incorporated in the neutralizing layer employed and in general, 5 to 30μ is suitable.

In the present invention, a timing layer (neutralization-rate controlling layer) may be located together with the above-mentioned neutralizing layer to control the decrease of the pH value. The timing layer retards the decrease of the pH value until after desired development and transfer are effected.

Namely, it prevents undesirable decrease of the density of transferred dye image caused by the early decrease of the pH value caused by the neutralizing layer within the system before development of silver halide and formation of diffusion transferred dye image are sufficiently effected.

As the timing layer various materials may be used; for instance, gelatin, polyvinyl alcohol, partial acetal of polyvinyl alcohol, partially hydrolyzed polyvinyl acetate, cyanoethylated polyvinyl alcohol, hydroxypropylmethylcellulose, isopropylcellulose, polyvinylamides, polyvinylamide graft copolymer, vinylidene chloride-acrylonitrileacrylic acid-terpolymer latex or a combination of a latex and a penetrant are useful.

The neutralizing layer and the timing layer may be coated either on the support on which the above-mentioned light-sensitive photographic element is coated, or, together with the image receiving layer, on a support other than that for the light-sensitive element. Further, they may be coated on a support for a processing sheet as mentioned hereinbelow.

In cases where the above-mentioned image receiving layer is coated on the same support as for the light-sensitive layer before processing, a processing sheet is preferably employed to distribute the alkaline processing composition uniformly and to make it spread smoothly.

As the support for the processing sheet the same materials as used for the above-mentioned light-sensitive element may optionally be used according to the purpose, and the sheet may be either transparent or opaque depending upon the purpose. On the support for the processing sheet may further be coated a layer containing a mordant as a scavenger, a neutralizing layer or a timing layer.

In cases where the image-receiving layer is combined with the light-sensitive layer before processing and they are peeled apart from each other after processing to obtain an image, a stripping layer may preferably be used. The stripping layer may be coated between the silver halide emulsion layer and the image-receiving layer.

The alkaline processing composition used in this invention is a liquid composition containing processing components necessary for the development of the silver halide emulsion and for the formation of the diffusion-transferred image. The solvent for the alkaline processing liquid is mainly a water, but other hydrophilic solvents such as methanol, methylcellosolve, etc., may also be used additionally. The alkaline processing composition contains an alkaline agent in an amount necessary for the development of the emulsion layer and the formation of the dye image. As the alkaline agent may be used, for example, sodium hydroxide, potassium hydroxide, calcium hydroxide, tetramethylammonium hydroxide, sodium carbonate, sodium phosphate, diethylamine, etc. The alkaline processing composition desirably has a pH value of not less than 12 at room temperature.

The alkaline processing composition may be incorporated with a thickner, i.e., a polymer thickner which is inert to an alkali solution, such as hydroxyethylcellulose, carboxymethylhydroxyethylcellulose, sodium carboxymethylcellulose or hydroxypropylcellulose. The concentration of the thickner is preferably 1 to 10% by weight based upon the alkaline processing composition, whereby the viscosity of the alkaline processing composition is in the range of around 100–300,000 centi-poise and the distribution of the composition during processing can be made uniform. Further, the thickner forms a solid (not flowing) film during processing so that the undesirable change of the image can be prevented effectively after the dye image is substantially formed. Moreover, the alkaline processing composition may preferably contain a silver halide developing agent.

As the representative examples for the silver halide developing agent which can be used in the present invention, there may be mentioned, for example, 3-pyrazolidone compounds, e.g., 1-phenyl-3-pyrazolidone, 1-phenyl-4,4-dimethyl-3-pyrazolidone, 1-m-tolyl-3-pyrazolidone, 1-phenyl-4-methyl-3-pyrazolidone, 1-phenyl-4-hydroxymethyl-4-methyl-3-pyrazolidone, 1-phenyl-5-methyl-3-pyrazolidone, 1-p-tolyl-3-pyrazolidone, 1,4-dimethyl-3-pyrazolidone, 1-phenyl-4,4-bis-(hydroxymethyl)-3-pyrazolidone, 4-methyl-3-pyrazolidone, 1-(3-chlorophenyl)-4-methyl-3-pyrazolidone, 1-(4-chlorophenyl)-4-methyl-3-pyrazolidone, 1-(3-chlorophenyl)-3-pyrazolidone, 1-(4-chlorophenyl)-3-pyrazolidone, 1-p-tolyl-4-methyl-3-pyrazolidone, 1-o-tolyl-4-methyl-3-pyrazolidone, 1-m-tolyl-4,4-dimethyl-3-pyrazolidone, 5-methyl-3-pyrazolidone, 1-(2-trifluoroethyl)-4,4-dimethyl-3-pyrazolidone, etc.; hydroquinone compounds, e.g., hydroquinone, 2,5-dichlorohydroquinone, 2-chlorohydroquinone etc.; catechol compounds, e.g., catechol, 3-methoxycatechol, 4-cyclohexylcatechol, etc.; aminophenol compounds, e.g., 4-aminophenol, 3-methyl-4-aminophenol, 3-methyl-4-aminophenol, N-methylaminophenol, 3,5-dibromoaminophenol, etc., and phenylenediamine compounds, e.g., N,N-diethyl-p-phenylenediamine, N,N-diethyl-3-methyl-p-phenylenediamine, 3-methoxy-N-ethyl-N-ethoxy-p-phenylenediamine, N,N,N',N'-tetramethyl-p-phenylenediamine, etc.

Of the developing agents mentioned above, black-and-white silver halide developing agent; particularly 3-pyrazolidone group developing agent, is preferred in general in order to reduce the strain in the dye image portion to be formed. Further, more than one silver halide developing agent may also be used in combination.

While the above-mentioned silver halide developing agent is generally incorporated in an alkaline processing composition, it may also be incorporated in at least one layer of the light-sensitive photographic element. Further, it may be incorporated in both the alkaline processing composition and the light-sensitive photographic element. In cases where it is incorporated in the light-sensitive photographic element, it may also be incorporated therein in the form of a precursor.

The layers in which said developing agent or precursor thereof is incorporated include for example, a silver halide emulsion layer, a DRR compound-containing layer, an intermediate layer, a protective layer, etc.

In the alkaline processing composition, there may further be incorporated a triazole group compound, e.g., 5-methylbenzotriazole; a benzimidazole group compound, e.g., 5-nitrobenzimidazole; a tetrazaindene group compound, e.g., sulfite of 4-hydroxy-5,6-cyclopenteno-1,3,3a,7-tetrazaindene; potassium bromide; and so on. Further a fogging agent, a silver halide solvent, etc., may also be incorporated depending upon the nature of the silver halide emulsion employed.

The alkaline processing composition used in this invention may preferably be contained in a rupturable container which is prepared, for example, by folding a sheet made of a material having no permeability to air and then sealing each edge so that if may contain said processing composition. It is desirable that the container in which a processing composition is to be filled with a designed so that it may be ruptured at a predetermined position or portion by the inside pressure applied when passed through a pair of pressure applying members and discharge the processing composition.

As the material for forming the above-mentioned container, there may advantageously be employed materials such as a laminate of polyethylene terephthalate, polyvinyl alcohol, polyethylene or a laminate of lead foil, copolymer of vinyl chloride and polyvinyl acetate. It is desirable that the container is fixed along the front edge of the light sensitive element and the contained processing liquid composition is spread on the surface of the light-sensitive layer in substantially one direction.

In the present invention, a layer containing a highly white light-reflecting agent may desirably be located as a background of the formed image at the opposite site to the direction of observation. While position of the light-reflecting layer may not be critical, it may desirably be located between the light-sensitive layer and the image receiving layer in cases where the light-sensitive layer is not peeled off from the image receiving layer. The light-reflecting layer may be located preliminarily as a layer, or it may be formed at the time of processing by incorporating a light-reflecting agent in an alkaline processing composition. As the light-reflecting agent may be used titanium dioxide, zinc oxide, barium sulfate, flaked silver, alumina, barium stearate, zirconium oxide, etc., singly or in combination of more than one agent. In cases where the light-reflecting layer is located as a layer in advance, it may be dispersed in an optical hydrophilic colloid through which alkaline solution can permeate, e.g., gelatin, polyvinyl alcohol, etc.

In the above-mentioned light-reflecting layer may further be added stylbene, cumarine, etc., as a brightening agent.

In cases where the silver halide emulsion is processed in the light after exposure, a layer containing opacifying agent may be located in order to protect the silver-halide emulsion from the light. The opacifying layer may be located as a layer in advance or it may be formed at the time of processing. As the oapcifying agent may be added, for example, carbon black and indicator dyes. Also certain desensitizing dyes may advantageously be used.

The light-reflecting layer and the opacifying layer may exist as the same layer or may be located as separate layers adjacent to each other.

As the film unit comprising the light-sensitive photographic element according to this invention, various kinds may be used. There may be used, for example, any one of the film units described in U.S. Pat. Nos. 3,415,644, 3,415,645, 3,415,646, 3,473,925, 3,573,042, 3,573,043, 3,594,164, 3,594,165, 3,615,421, 3,576,626, 3,658,524, 3,635,707, 3,672,890, 3,730,718, 3,701,656 and 3,689,262; LOP No. 50-6337/1975 and Belgian Patent Nos. 757,959 and 757,960.

To the film units mentioned above various additives such as a filter dye, etc., which can suitably improve the photographic properties, may also be added to a layer positioned on the side from which incident light comes at the time of exposure, in relation to the silver halide emulsion layer. As the filter dye, there may be used a dye which is stable at an ordinary pH value or is changeable to be colorless upon contact with the alkaline processing composition, by decomposition, etc.

After diffusion transfer of the image dye to the image receiving layer, silver image and dye or dye precursor corresponding to the diffusion transferred image remain in the light-sensitive layer. When the remaining silver and silver halide is removed by treatment with a bleaching bath and a fixing bath or a bleach-fixing bath and further the dye precursor is converted, if necessary, into a dye, a dye image, which is reversed to the dye image formed on the image receiving layer, can also be obtained.

EXAMPLE 1

Preparation of Magenta DRR Compound 1

To a mixture of 500 ml. of dioxane and 50 g. of 3-amino-2-[4-(2,4-di-tert-petylphenoxy)butylcarbamoyl]-5-methoxyindole were added 80 ml. of pyridine, and 61 g. of 2-tertbutylsulfamoyl-5-(N,N-dimethylaminosulfonamido)-4-(4-chlorosulfonylphenylazo)-1-naphthol were added portionwise thereto at room temperature with stirring. The reaction mixture was stirred at room temperature for 2 hours. Then, it was heated at 60° C. for 30 minutes and cooled. To the reaction mixture were gradually added 2 l. of a 7 N aqueous hydrochloric acid solution and, after stirring, the so separated precipitate was collected on a filter funnel.

The precipitate was washed with water, dispersed in 200 ml. of methanol, heated and then cooled. It was then filtered and collected on a filter funnel and then dried.

Thereafter, the product was dissolved in 1 l. of ethyl acetate, 200 g. of silica gel were added thereto and the mixture was filtered. Insolubles on a filter funnel were washed with 500 ml. of ethyl acetate. The filtrate and the washing were combined and then concentrated to about 100 ml. under reduced pressure. The residue was added to 1 l. of hot ethanol and the mixture was cooled. The crystalline substance thus prepared was collected on a filter funnel and then dried to give 76.3 g. of the desired product. Yield, 72%. mp. 241°–245° C.

Preparation of intermediate

C-1: 3-Amino-5-methoxy-2-[4-(2,4-di-tert-pentylphenoxy butylcarbamoyl]-indole

In 200 ml. of toluene were mixed 21.9 g. (0.1 mol) of ethyl 5-methoxyindole-2-carboxylate and 30.5 g. of 4-(2,4,-di-tert-pentylphenoxy)butylamine and then 50 ml. of the toluene were distilled off. After cooling to 50° C., 36.5 ml. of a 30% sodium methylate solution were added thereto. The reaction mixture was boiled under relux for 5 hours. To the reaction mixture while hot were added dropwise 475 ml. of methanol. Then, the reaction mixture was cooled to 0° C., the crystalline substance thus formed was collected on a filter funnel and washed with 200 ml. of methanol. The product was 5-methoxy-2-[4-(2,4-di-tert-pentylphenoxy)butylcarbamoyl)-indole.

The whole product was dissolved in 375 ml. of glacial acetic acid with mild heating, cooled to room temperature and 7.6 g. of sodium nitrite were added portionwise thereto over 1 hour. Stirring was continued for additional 1 hour and then the reaction mixture was heated to 40° C. for a while. After cooling to 20° C., the solid precipitate separated in the reaction mixture was collected on a filter funnel. It was washed first with glacial acetic acid and subsequently with a large volume of water. The product was 5-methoxy-3-nitroso-2-[4-(2,4-di-tert-pentylphenoxy)butylcarbamoyl]-indole.

Then, the whole product was added to 400 ml. of methanol with vigorous stirring through a fine sieve. To the resultant slurry was rapidly added an aqueous solution of 41 g. of sodium dithionite (165 ml. of water) and the mixture was maintained at a temperature of 60°–65° C. over 2 hours. It was then cooled to 20° C. and the residue was collected on a filter funnel. It was washed with 600 ml. of a 1% aqueous solution of sodium dithionite and dried to give 33 g. of the desired product in an overall yield of 67%. mp. 145°–146° C.

D-1:
2-tert-Butylsulfamoyl-5-(N,N-dimethylaminosulfonamido)-4-(4-chlorosulfonylphenylazo)-1-naphthol To a mixture of 500 ml. of chloroform and 61 ml. of dimethylformamide were added dropwise 28 ml. of phosphorus oxychloride with stirring. Then, 61 g. of 2-tert-butylsulfamoyl-5-(N,N-dimethylaminosulfonamido)-4-(4-sulfonphenylazo)-1-naphthol sodium salt were added thereto over about 10 minutes, whereupon an exothermic reaction occurred and the temperature was raised to 55° C. Stirring was continued for 2 hours while allowed to cool and then it was left overnight to separate a crystalline substance. The substance was collected on a filter funnel, washed with chloroform and ice-water and finally dried to give 76 g. of the desired product in a yield of 75%.

D-2:
2-tert-Butylsulfamoyl-5-(N,N-dimethylaminosulfonamido)-4-(4-sulfophenylazo)-1-naphthol sodium salt To 100 ml. of water were added 20.75 g. of sulfanilic acid and 6.36 g. of sodium carbonate and stirring was effected. When a homogeneous clear solution was formed, 9 g. of sodium nitrite were added thereto. The solution was gradually added with stirring to 120 ml. of ice-water containing 20 ml. of conc. hydrochloric acid to form a diazo solution.

Separately, to a solution of 20 g. of sodium hydroxide in 30 ml. of water were added portionwise 40.1 g. of 2-tert-butylsulfamoyl-5-(N,N-dimethylaminosulfonamido)-1-naphthol and then 2 ml. of octyl alcohol as a defoaming agent to form a coupler solution.

Next, the above coupler solution cooled to 5° C. was mixed with the above diazo solution (which should be prepared immediately before the addition) and stirring was continued for 2 hours. To the reaction mixture were added 120 g. of sodium chloride, heated up to 65° C. and cooled. The so separated crystalline substance was collected on a filter funnel, washed with 100 ml. of a 20% aqueous solution of sodium chloride and then with 50 ml. of cold water and finally dried to afford 56 g. of the desired product in a yield of 92%. mp. above 300° C.

D-3:
2-tert-Butylsulfamoyl-5-(N,N-dimethylaminosulfonamido)-1-naphthol

To a mixture of 98 g. of 5-amino-2-tert-butyl-sulfamoyl-1-naphthol and 800 ml. of pyridine were added dropwise under ice-cooling and stirring 92 g. of N,N-dimethylaminosulfonyl chloride and stirring was continued at room temperature for 16 hours. Then, 100 ml. of water were added and stirring was continued for additional 1 hour. The reaction mixture was poured into a mixture of 1040 ml. of conc. hydrochloric acid and 4000 ml. of ice-water to separate a solid precipitate in situ. The product was collected on a filter funnel and washed with water.

Thereafter, the product was dissolved in an alkaline solution of 80 g. of sodium hydroxide in 920 ml. of water, insolubles were filtered off, the filtrate was poured into a mixture of 330 ml. of conc. hydrochloric acid with 2000 ml. of ice-water to separate a solid precipitate, which was then collected on a filter funnel, well washed with water and dried to give 100 g. of the desired product in a yield of 75%. mp. 95°–103° C.

EXAMPLE 2

Preparation of Magenta DRR Compound 2

To a mixture of 50 ml. of chloroform and 5 g. of 4-amino-2-[4-(2,4-di-tert-pentylphenoxy)butylcarbamoyl]-1-naphthol were added 8 ml. of pyridine and then 6.1 g. of 2-tert-butylsulfamoyl-5-(N,N-dimethylaminosulfonamido)-4-(4-chlorosulfonylphenylazo)-1-naphthol were added portionwise under nitrogen stream with ice-cooling and stirring. The reaction mixture was stirred under ice-cooling for 1 hour and then at room temperature for further 1 hour. Then, 100 ml. of methanol and 15 ml. of water were added, the resulting mixture was concentrated under reduced pressure and 50 ml. of water were added to the residue. The mixture was made acidic with conc. hydrochloric acid, the precipitate thus separated was collected on a filter funnel, washed with water and dried. The precipitate was further purified by a benzene-silica gel chromatography to give 68.9 g. of the desired product. Yield, 65%. mp. 134°–139° C.

EXAMPLE 3

Preparation of Magenta DRR Compound 9

Following the same procedures as in the Preparation of Magenta DRR Compound 1, the desired product (yield, 68%) was sunthesized from 3-amino-2-[4-(2,4-di-tert-pentylphenoxy)butylcarbamoyl]-5-methoxy-indole and 2-tert-butylsulfamoyl-5-morpholinosulfonamido-4-(4-chlorosulfonylphenylazo)-1-naphthol. mp. 248°–256° C.

Preparation of intermediate

D-4: 2-tert-Butylsulfamoyl-5-morpholinosulfonamido 4-(4-chlorosulfonylphenylazo)-1-naphthol Following the same procedures as in the Preparation of intermediate for Magenta DRR Compound 1, the desired product (yield, 71%) was synthesized from 2-tert-butylsulfamoyl-5-morpholinosulfonamido-4-(4-sulfophenylazo)-1-naphthol sodium salt.

D-5: 2-tert-Butylsulfamoyl-5-morpholinosulfonamido 4-(4-sulfophenylazo)-1-naphthol sodium salt Following the same procedures as in the Preparation of intermediate for Magenta DRR Compound 1, the desired product (yield, 87%) was synthesized from 2-tert-butylsulfamoyl-5-morpholinosulfonamido-1-naphthol and sulfanilic acid.

D-6:
2-tert-Butylsulfamoyl-5-morpholinosulfonamido-1-naphthol

To a mixture of 9 g. of 5-amino-2-tert-butylsulfamoyl-1-naphthol with 90 ml. of pyridine were added portionwise under ice-cooling and stirring 11 g. of morpholinosulfonyl chloride and stirring was continued at room temperature for 20 hours. Thereafter, 10 ml. of water were added and stirring was carried out for further 1 hour. Into a mixture of 115 ml. of conc. hydrochloric acid with 400 ml. of ice-water was poured the above reaction mixture to separate a solid precipitate, which was then collected on a filter funnel and washed with water. The product was dissolved in an alkaline solution of 6 g. of sodium hydroxide in 150 ml. of water, insolubles were filtered off, the filtrate was poured into a mixture of 15 ml. of conc. hydrochloric acid with 150 ml. of ice-water to separate a solid precipitate. The precipitate was collected on a filter funnel, washed well with water and then dried to afford 9.6 g. of the desired product in a yield of 72%. mp. 105°–110° C.

EXAMPLE 4

Spectra and light stability of a dyed film strip comprising a mixture of gelatin and latex mordant (1/1 by weight), said mixture being coated upon a transparent polyester support at coated amount of each component was respectively 2.5 g/m². The latex mordant as used herein was poly(styrene-co-vinylbenzyl chloride-co-N-benzyl-N,N-dimethyl-N-vinylbenzylammonium chloride-co-divinylbenzene) (molar ratio of 4.90:0.49:4.41:0.2) as disclosed in LOP No. 51-73440/1976.

The dyeing was effected as follows.

The dye was first dissolved in a 0.86 N aqueous solution of potassium hydroxide. An undyed film strip was dipped into the dye solution and dipping was continued until a transmission density reached about 1.0.

Then, this strip was washed with water, equilibrated over about 1 minutes by dipping it into an aqueous standard buffer solution having the indicated pH values and then dried.

A. Spectrophotometry

In the case of the dye colored on the mordant on a transparent support, absorption spectrum of the dye was measured by a transmission method using a spectrophotometer. Its maximum wave length ($\lambda$ max) and respective absorption band width ($\frac{1}{2}$ Bw) at a half concentration of $\lambda$ max are also shown in Table 3. The band width as well as $\lambda$ max can represent chromaticity. The more lightness and purity of color is increased, the less these values become.

B. Dependance of absorption spectrum on pH value

As seen in the light-sensitive photographic element mentioned below, the dye is placed under alkaline condition when treated and under acidic condition of around pH 4 as the time lapses. Therefore, stable chromaticity should be ideally shown over a wide range of pH value. The Table also shows the pH range that can keep a favorable stable chromaticity when each dye is dyed on the mordant.

C. Light stability

A dyed strip film was subjected to light irradiation and its light stability was measured by the following procedures.

A dyed film strip with a transmission density of about 1.0–1.5 was irradiated by a 6000 W xenon arc lamp for 24 hours. Irradiation strength on the strip surface was 60,000 lx.

The optical density at $\lambda$ max before exposure (Do) and after exposure (D) was measured and the residual rate (%) was expressed in terms of a value from D/Do×100 in Table 3.

D. Image-forming rate of DRR compound

The layered monochromatic photosensitive element was prepared and treated as prescribed.

After treatment with a processing composition, a dye image was observed through a transparent support of the light-sensitive photographic element and reflection density of the dye image was continuously measured through a green filter ($\lambda$ max=554 nm) using SAKURA photoelectric densitometer type PDA-60.

In Table 4 are shown the time to reach 50% density (t 0.5) and 80% density (t 0.8) of the maximum density (D max) at the time of 15 minutes after processing with the processing composition. The time expresses image-forming rate. In Table 4 is shown the maximum density (D max) at 2 days after the treatment with the processing composition. The smaller is the density difference between density at 15 minutes and that of 2 days, the smaller change of the produced dye image is. Processing was done at 25° C.

Preparation of layered monochromatic photographic element:

A transparent polyethylene terephthalate film support with a thickness of 150 μm was coated successively with the following layers to make up a layered monochromatic light-sensitive photographic element.

(1) Image receiving layer having a dry film thickness of 2.5–3.0 μm containing each 2.5 g/m² of gelatin and poly(styrene-co-vinylbenzylchloride-co-N-benzyl-N,N-dimethyl-N-vinylbenzylammonium chloride-co-divinylbenzene) (molar ratio of 4.90:0.49:4.41:0.2).

(2) Light reflecting layer having a dry film thickness of 7–8 μm containing titanium dioxide (22 g/m²) and gelatin (2.2 g/m²).

(3) Opacifying layer having a dry film thickness of 4 μm containing carbon black (2.8 g/m²) and gelatin (1.8 g/m²)

(4) Magenta DRR component containing layer having film thickness of 2.2 μm containing magenta DRR compound (1 m mol/m²), N,N-diethyllaurylamide (1.1 g/m²) and gelatin (2.5 g/m²).

(5) Green sensitive emulsion layer having a dry film thickness of 1.5 μm containing green sensitive internal latent image direct positive silver bromide emulsion (1.4 g/m² calculated in terms of silver), potassium 2-octadecylhydroquinone-5-sulfonate (0.1 g/m²), formyl-4-methylphenylhydrazide (13 mg/m²) and gelatin (1.65 g/m²).

(6) Protective layer having a dry film thickness of about 0.7 μm containing mucochloric acid (100 mg/m²) and gelatin (1 g/m²)

Dispersion of DRR compound was prepared as mentioned below.

To a solution of 1 g. of DRR compound in 3 ml. of ethyl acetate was added N,N-diethyllaurylamide and the resulting solution was emulsified and dispersed in 25 ml. of a 10% aqueous gelatin solution containing 0.24 g. of "Alkanol XC" (available from E. I. Du Pont)

In cases where DRR compound is sparingly soluble in ethyl acetate, cyclohexanone was used.

Next, a processing sheet was prepared by successive coating of the following layers onto a transparent polyethylene terephthalate film support having a thickness of 100 μm.

(1) Neutralizing layer having a dry film thickness of 22.0 μm containing a copolymer of acrylic acid and butyl acrylate (75/25% by weight) (22 g/m²)

(2) Timing layer (the lower layer of the two-layer construction) having a dry film thickness of 5.0 μm containing cellulose diacetate (acetyl number 40%) (5 g/m²)

(3) Timing layer (the upper layer of the two-layer construction) having a dry film thickness of 1 μm containing poly(vinylidene chloride-co-acrylonitrile-co-acrylic acid) (79/15/6% by weight) (1.1 g/m$^2$)

The resulting layered monochromatic light-sensitive photographic element was subjected to the prescribed exposure through an optical wedge which has 30 density steps with the density difference between each two steps being 0.15. Then, the above-mentioned processing sheet was put thereupon and a pod, each containing about 1.0 ml. of a processing composition having the following formulation, were adhered between them to form a film unit. Then, the film unit was passed through a pair of rollers paralleled under pressure and having a clearance of about 340 μm to break the pod and develop its content between the said light-sensitive photographic element and the processing sheet.

The formulation of the processing composition as used herein was as follows:

| | |
|---|---|
| Potassium hydroxide | 56 g. |
| Sodium sulfite | 2.0 g. |
| 4-Hydroxymethyl-4-methyl-1-phenyl-3-pyrazolidone | 8.0 g. |
| 5-Methylbenzotriazole | 2.8 g. |
| Carbon black ("Raven-450" available from Columbian Carbon) | 150 g. |
| Carboxymethylcellulose sodium salt (of a high viscosity, vailable from Tokyo Kasei K.K.) | 50.0 g. |
| Benzyl alcohol | 1.5 ml. |
| Distilled water | made up to 1000.0 ml. |

Dye image was observed through the transparent support of the light-sensitive photographic element after several minutes.

E. Determination of sharpness of image

The above layered monochromatic light-sensitive photographic element was subjected to the prescribed exposure through an MTF chart, the above processing sheet was put thereupon and a pod, each containing about 1.0 ml. of the aforesaid processing composition, was adhered between them to form a film unit.

Next, the said film unit was passed through a pair of rollers paralleled under pressure and having a clearance of about 340 μm to break the pods and diffuse its content between the said light-sensitive photographic element and the processing sheet. A thickness of the developed processing composition was about 75 μm.

After the processing, sharpness of a magenta transfer image upon lapse of 1 hour was measured by a microdensitometer to be 6–8 lines/mm.

Then, the same sample was processed and left for 1 day. Sharpness was similarly measured to obtain the substantially equivalent results and no reduction in shapness with time. It shows that there is no substantial desorption of the released magenta dye after mordanting, namely, no image bleeding.

Table 1 shows examples of the present DRR compounds and Table 2 shows dyes released from the given DRR compounds.

TABLE 1

| No. of DRR comp. | Car | m | J | $\begin{array}{c}R^1\\ \diagdown\\ N-\\ \diagup\\ R^2\end{array}$ | X | Y | Z | Bonded* position |
|---|---|---|---|---|---|---|---|---|
| 1 | a | 0 | | CH$_3$–N(–CH$_3$)– | OH | —SO$_2$NHC(CH$_3$)$_3$ | H | 4 |
| 2 | b | 0 | | CH$_3$–N(–CH$_3$)– | OH | —SO$_2$NHC(CH$_3$)$_3$ | H | 4 |
| 3 | a | 1 | —⟨phenylene⟩— | CH$_3$–N(–CH$_3$)– | OH | —SO$_2$NHC(CH$_3$)$_3$ | H | 4 |
| 4 | a | 1 | —CH$_2$CH$_2$— | CH$_3$–N(–CH$_3$)– | OH | —SO$_2$NHC(CH$_3$)$_3$ | H | 4 |
| 5 | a | 0 | | CH$_3$–N(–CH$_3$)– | OH | —SO$_2$NHCH$_3$ | H | 4 |
| 6 | a | 0 | | H$_2$N— | OH | —SO$_2$NHC(CH$_3$)$_3$ | H | 4 |
| 7 | a | 1 | —⟨phenylene⟩— | H$_2$N— | —OCOCH$_2$Cl | —SO$_2$NH$_2$ | 2-Cl | 5 |

TABLE 1-continued

Car―(―J―NHSO₂―)ₘ― [phenyl with Z, R¹ substituents] ―N=N― [naphthyl with Y, X, NSO₂NH― substituents]
                                             R¹\N/R²

| No. of DRR comp. | Car | m | J | R¹\N―/R² | X | Y | Z | Bonded* position |
|---|---|---|---|---|---|---|---|---|
| 8 | b | 0 | | morpholino (O()N―) | —OCOCH₂Cl | —SO₂NH₂ | 2-OCH₃ | 4 |
| 9 | a | 0 | | morpholino (O()N―) | OH | —SO₂NHC(CH₃)₃ | H | 4 |

*Position at which Car group is bonded with respect to azo bond

Car a

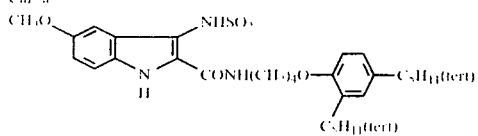

b

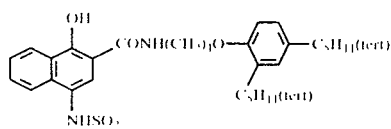

TABLE 2

H₂NSO₂―(―J―NHSO₂―)ₘ― [phenyl with Z, R¹] ―N=N― [naphthyl with Y, OH, NSO₂NH―]
                                        R¹\N/R²

| No. of released dye | m | J | R¹\N―/R² | Y | Z | Bonded* position |
|---|---|---|---|---|---|---|
| 1 | 0 | | CH₃\N―/CH₃ | —SO₂NHC(CH₃)₃ | H | 4 |
| 2 | 0 | | CH₃\N―/CH₃ | —SO₂NHC(CH₃)₃ | H | 3 |
| 3 | 1 | —⌬— (p-phenylene) | CH₃\N―/CH₃ | —SO₂NHC(CH₃)₃ | H | 4 |
| 4 | 1 | —CH₂CH₂— | CH₃\N―/CH₃ | —SO₂NHC(CH₃)₃ | H | 4 |
| 5 | 0 | | CH₃\N―/CH₃ | —SO₂NH₂ | H | 4 |

TABLE 2-continued

Structure:
$H_2NSO_2\text{-}(J\text{-}NHSO_2)_m\text{-}\underset{6}{\underset{5}{\bigcirc}}\overset{3}{\underset{2}{\overset{Z}{\underset{R^1}{}}}}\text{-}N=N\text{-}\text{(naphthalene with }Y,\ OH,\ NSO_2NH)$ with $R^1R^2N\text{-}NSO_2NH\text{-}$ group

| No. of released dye | m | J | $\begin{array}{c}R^1\\ \diagdown\\ N-\\ \diagup\\ R^2\end{array}$ | Y | Z | Bonded* position |
|---|---|---|---|---|---|---|
| 6 | 0 | | $\begin{array}{c}CH_3\\ \diagdown\\ N-\\ \diagup\\ CH_3\end{array}$ | $-SO_2NHCH_3$ | H | 4 |
| 7 | 0 | | $\begin{array}{c}CH_3\\ \diagdown\\ N-\\ \diagup\\ CH_3\end{array}$ | $-SO_2N(C_3H_7\text{-iso})_2$ | H | 4 |
| 8 | 0 | | $\begin{array}{c}CH_3\\ \diagdown\\ N-\\ \diagup\\ CH_3\end{array}$ | $-SO_2NH\text{-}\bigcirc\text{-}H$ | H | 4 |
| 9 | 0 | | $H_2N-$ | $-SO_2NHC(CH_3)_3$ | H | 4 |
| 10 | 1 | $\bigcirc$ (p-phenylene) | $H_2N-$ | $-SO_2NH_2$ | 2-Cl | 5 |
| 11 | 0 | | $\begin{array}{c}C_2H_5\\ \diagdown\\ N-\\ \diagup\\ C_2H_5\end{array}$ | $-SO_2NHCH_3$ | H | 4 |
| 12 | 0 | | $\begin{array}{c}\diagup\diagdown\\ O\quad N-\\ \diagdown\diagup\end{array}$ | $-SO_2NH_2$ | 2-OCH$_3$ | 4 |
| 13 | 0 | | $\begin{array}{c}\diagup\diagdown\\ O\quad N-\\ \diagdown\diagup\end{array}$ | $-SO_2NHC(CH_3)_3$ | H | 4 |

*Position at which $H_2NSO_2\text{-}(J\text{-}NHSO_2)_m\text{-}$ group is bonded with respect to azo-bond.

TABLE 3

| No. of dye | pH | λmax nm | ½Bw nm | pH range showing favourable spectrum | Light resistance $D/D_o \times 100\%$ |
|---|---|---|---|---|---|
| 1 | 4 | 554 | 99 | 2–12 | 97 |
| 2 | 4 | 551 | 99 | 2–12 | 98 |
| 3 | 4 | 554 | 100 | 2–12 | 95 |
| 4 | 4 | 553 | 98 | 2–12 | 90 |
| 5 | 5 | 543 | 110 | 3–12 | 64 |
| 6 | 4 | 543 | 105 | 2–12 | 65 |
| 7 | 4 | 553 | 110 | 2–12 | 67 |
| 8 | 4 | 549 | 107 | 2–12 | 69 |
| 9 | 4 | 548 | 109 | 3–12 | 78 |
| 10 | 5 | 549 | 99 | 3–12 | 83 |
| 11 | 4 | 555 | 100 | 2–12 | 80 |
| 12 | 5 | 550 | 103 | 3–12 | 96 |
| 13 | 4 | 554 | 100 | 2–12 | 98 |
| A | 4 | 555 | 100 | 3–12 | 65 |

Compound A, which has the following chemical structure is described in the U.S. Pat. No. 3,954,476, was used for comparison:

A: $H_2NO_2S\text{-}\bigcirc\text{-}N=N\text{-}$(naphthalene with $SO_2NHC(CH_3)_3$, $OH$, $CH_3SO_2NH$)

As shown in the above Table, all dyes released from DRR compounds of this invention have been proven to have excellent chromaticity and light stability.

TABLE 4

| No. of DRR comp. | $D_{max}$ After 15 mins | $D_{max}$ After 2 days | t 0.5 | t 0.8 |
|---|---|---|---|---|
| 1 | 2.48 | 2.51 | 1 min. 25 sec. | 2 min. 42 sec. |
| 2 | 2.43 | 2.46 | 1 min. 23 sec. | 2 min. 45 sec. |
| 3 | 2.52 | 2.58 | 1 min. 30 sec. | 2 min. 10 sec. |
| 4 | 2.55 | 2.59 | 1 min. 12 sec. | 2 min. 31 sec. |
| 5 | 2.51 | 2.52 | 1 min. 28 sec. | 2 min. 37 sec. |
| 6 | 2.46 | 2.50 | 1 min. 25 sec. | 2 min. 12 sec. |
| 7 | 2.26 | 2.28 | 1 min. 36 sec. | 2 min. 23 sec. |
| 8 | 2.12 | 2.16 | 2 min. 11 sec. | 4 min. 25 sec. |
| 9 | 2.32 | 2.35 | 1 min. 47 sec. | 3 min. 14 sec. |
| B | 2.32 | 2.59 | 2 min. 30 sec. | 3 min. 15 sec. |

Compound B, which has the following chemical structure and is disclosed in the U.S. Pat. No. 3,954,476, was used for comparison.

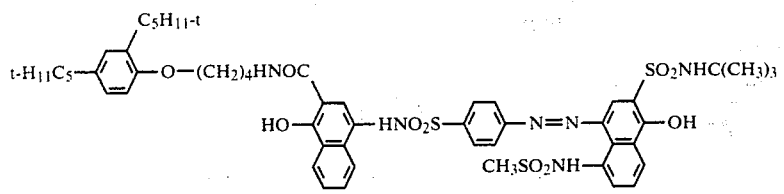

As shown in the above Table, all DRR compounds of this invention have been proven to form an image in an extremely short period of time.

Moreover, the compounds of this invention have shown less Dmax increase between 15 minutes and 2 days after image-forming process in comparison with a known compound. Thus it is known that according to this invention less undesirable additional diffusion occurs over a long period of time after the image-forming process.

We claim:

1. A light-sensitive photographic element comprising a support and at least one light-sensitive silver halide emulsion layer coated thereon and having associated therewith a magenta image dye-providing compound represented by formula [I]:

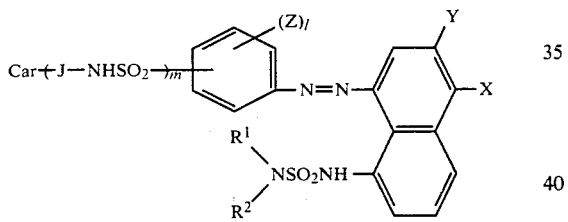

wherein

Car represents a carrier moiety having an organic ballast group which can be oxidized under alkaline conditions to release a diffusible dye or a precursor thereof from said compound;

$R^1$ and $R^2$, which may be the same or different, independently represent a hydrogen atom or an alkyl group having 1 to 3 carbon atoms (provided that the total sum of carbon atoms in $R^1$ and $R^2$ does not exceed 5), or $R^1$ and $R^2$ may form, together with the nitrogen atom, a 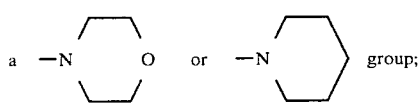 group;

X represents a hydroxyl group, a salt thereof or a group, which can be converted into a hydroxyl group by hydrolysis, having the following formula:

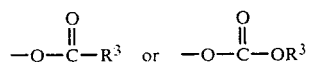

in which $R^3$ represents an alkyl or haloalkyl group having 1 to 18 carbon atoms or a phenyl group which may be substituted;

Y represents a

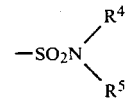

group in which $R^4$ and $R^5$, which may be the same or different, independently represent a hydrogen atom, an alkyl group having 1 to 6 carbon atoms or a cycloalkyl group (provided that the total sum of carbon atoms in $R^4$ and $R^5$ does not exceed 6);

Z represents a hydrogen atom, a chlorine atom, a methyl group or a methoxy group;

l is 1 or 2 provided that when l is 2 each Z may be the same or different;

m is 0 or 1;

and

J represents a bivalent linking group having the formula $-R^6-(O)_n-R_p^7-$ in which $R^6$ and $R^7$, which may be the same or different, independently represent an alkylene group having 1 to 8 carbon atoms, a phenylene group which may be substituted; n represents 0 or 1; p represents 0 or 1 provided that p is 1 when n is 1 and 1 or 0 when n is 0 (provided that, when p is 1, the total sum of carbon atoms in $R^6$ and $R^7$ does not exceed 13).

2. A light-sensitive photographic element according to claim 1 wherein said Car represents a group having following formula [II]:

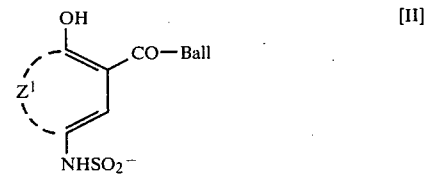

wherein Ball represents an organic ballast group containing sufficient carbon atoms to render the compound nondiffusibility during processing in an alkaline processing composition and $Z^1$ represents a group of carbon atoms necessary to complete a benzene ring, 5,6,7,8-tetrahydronaphthalene or a naphthalene ring.

3. A light-sensitive photographic element according to claim 2 wherein J in formula [I] represents a bivalent group

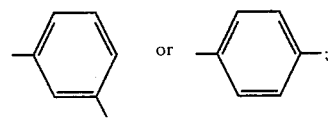

X represents a hydroxyl group; and $R^1$ and $R^2$ independently represent a methyl group or an ethyl group.

4. A light-sensitive photographic element according to claim 3 wherein said Car represents a group having the following formula:

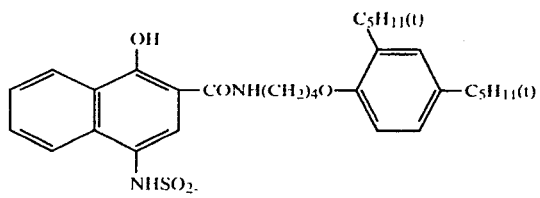

5. A light-sensitive photographic element according to claim 4 wherein said magenta dye-providing compound is represented by the following formula:

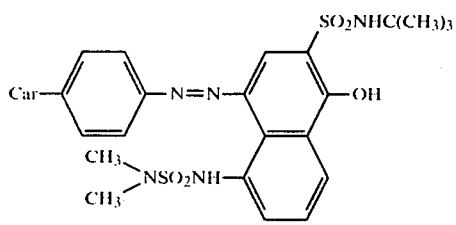

6. A light-sensitive photographic element according to claim 1 wherein said Car represents a group having following formula [III]:

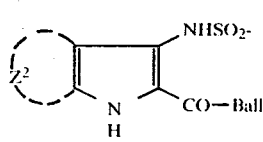

[III]

wherein Ball represents an organic ballast group containing sufficient carbon atoms to render the compound nondiffusibility during processing in an alkaline processing composition and $z^2$ represents a group of carbon atoms necessary to complete a benzene ring.

7. A light-sensitive photographic element according to claim 6 wherein J in formula [I] represents a bivalent group

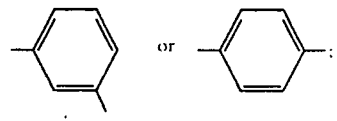

X represents a hydroxyl group; and $R^1$ and $R^2$ independently represent a methyl group or an ethyl group.

8. A light-sensitive photographic element according to claim 7 wherein said Car represents a group having the following formula:

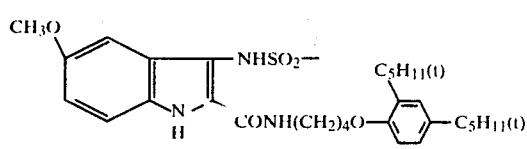

9. A light-sensitive photographic element according to claim 8 wherein said magenta dye-providing compound is represented by the following formula:

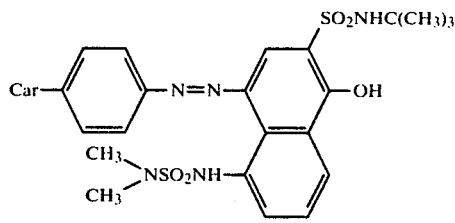

* * * * *